United States Patent [19]
Wölfel

[11] Patent Number: 5,128,603
[45] Date of Patent: Jul. 7, 1992

[54] FORWARD CONVERTER USING AN INVERTER INCLUDING A TRANSISTOR

[75] Inventor: Werner Wölfel, Stuttgart, Fed. Rep. of Germany

[73] Assignee: Alcatel N.V., Amsterdam, Netherlands

[21] Appl. No.: 518,708

[22] Filed: May 7, 1990

[30] Foreign Application Priority Data

May 5, 1989 [DE] Fed. Rep. of Germany ....... 3914799

[51] Int. Cl.$^5$ .......................... G05F 1/56; H02M 3/335
[52] U.S. Cl. ..................................... 323/282; 363/21; 363/97
[58] Field of Search ............... 323/282, 283, 288, 351; 363/20, 21, 127, 89, 97

[56] References Cited

U.S. PATENT DOCUMENTS

| | | |
|---|---|---|
| 4,172,244 | 10/1979 | Zeis ........................................ 336/73 |
| 4,672,303 | 6/1987 | Newton . |
| 4,870,555 | 9/1989 | White . |
| 4,929,884 | 5/1990 | Bird et al. ........................... 323/313 |

FOREIGN PATENT DOCUMENTS

| | | |
|---|---|---|
| 3727170 | 2/1989 | Fed. Rep. of Germany . |
| 0133980 | 10/1981 | Japan .................................. 323/285 |
| 0046164 | 2/1990 | Japan . |

OTHER PUBLICATIONS

Ghausi, *Electronic Circuits and Devices*, © 1985, pp. 626, 633 and 634.

Primary Examiner—Peter S. Wong
Attorney, Agent, or Firm—Spencer, Frank & Schneider

[57] ABSTRACT

In a forward converter having at least one storage inductance, a clock switch connected in series with a winding of the at least one storage inductance, a control circuit for outputting a control signal as a function of the magnitude of an output voltage relative to a set reference voltage, and at least one MOS field effect transistor, MOSFET, which is operated inversely to the clock switch and, during ON periods of the clock switch, provides a free-running circuit via the storage inductance and a load connected at the output of the forward converter, a further transistor operating as an inverter is provided. The further transistor is connected to receive the control signal from the control circuit and is connected to the gate of the at least one MOSFET so that the at least one MOSFET receives the control signal for switching the clock switch via the further transistor as a voltage across the further transistor.

14 Claims, 3 Drawing Sheets

FIG. 4
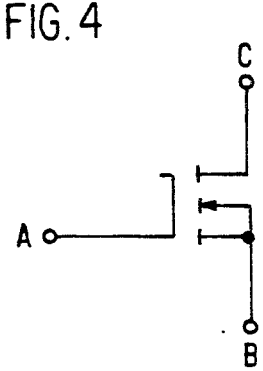
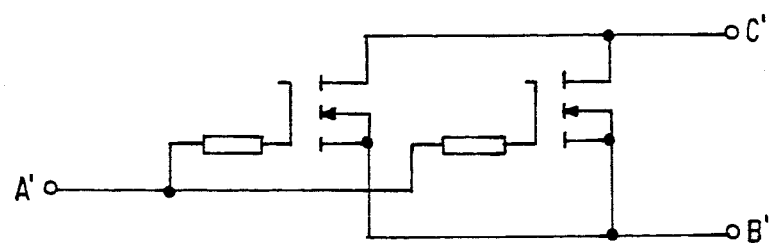
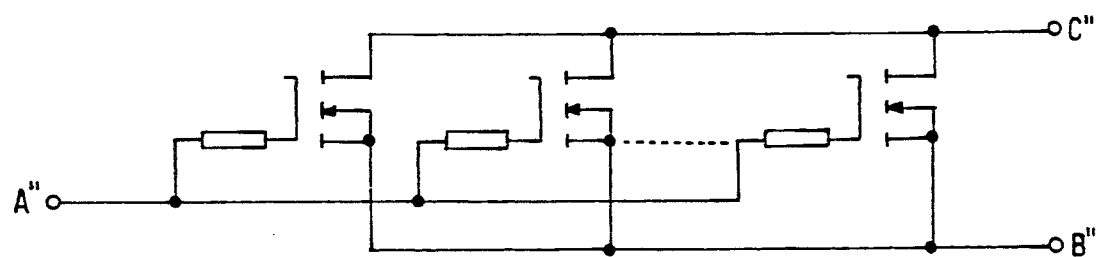
FIG. 5

FORWARD CONVERTER USING AN INVERTER INCLUDING A TRANSISTOR

CROSS REFERENCE TO RELATED APPLICATION

This application claims the priority of application Ser. No. P 39 14 799.1, filed May 5, 1989, in the Federal Republic of Germany, the subject matter of which is incorporated herein by reference.

BACKGROUND OF THE INVENTION

The present invention relates to forward converters. More particularly, the invention relates to forward converters having a storage inductance, a clock switch connected in series with a winding of the storage inductance and actuated by a control circuit as a function of the magnitude of the output voltage relative to a set reference voltage, and a MOS field effect transistor (MOSFET) which is operated inversely to the clock switch and, during the ON periods of the clock switch, permits the establishment of a free running circuit via the storage inductance and the connection of a load to the output of the forward converter.

A forward converter of this type is disclosed, for example, in DE-OS 3,727,170. Here (see, for example, FIG. 2 of the DE-OS) a forward converter equipped with a transformer former employs, instead of the otherwise customary power diodes on the secondary side, power MOSFET's which in the ON state exhibit a lower voltage drop across their source-drain path than diodes or Schottky diodes and thus generate lower losses than such diodes or Schottky diodes.

In the prior art forward converter, the signal for actuating the MOSFET's is obtained from special secondary windings of the transformer and is fed to the MOSFET gates by way of complicated dual-terminal structures. In addition to the costs for the additional transformer windings and the dual-terminal components, this has the drawback that the switching times of the MOSFET's are shifted relative to those of the clock switch on the primary side due to the switching delay caused by the transformer inductance. Thus accurate operation in synchronism with the clock switch so as to guarantee optimum efficiency is not ensured.

If a demagnetization coil is employed there exists the danger, particularly if the primary voltage source is overloaded, that the necessary control voltage for the inversely operated MOSFET at the output of the secondary winding furnishing the control voltage for the MOSFET is realized too late or not at all.

In a forward converter operated without transformer, actuation by way of secondary windings as in the prior art is impossible in any case.

SUMMARY OF THE INVENTION

It is an object of the present invention to improve a forward converter of the above-mentioned type with respect to the actuation of its MOSFET's, which are employed instead of diodes, so that it is possible to operate these MOSFET's in precise synchronism with the clock switch. Moreover, the costs for actuating the MOSFET's are to be reduced and the necessity of employing a transformer is to be eliminated.

This is accomplished in a forward converter operating without qalvanic separation by connecting an additional transistor operating as an inverter ahead of the gate of the MOSFET so that the MOSFET receives the control signal for switching the clock switch through the additional transistor. In another embodiment of the invention a forward converter equipped with an isolating transformer and first and second MOSFETS is provided with an additional transistor operating as an inverter and being connected to the gate of the second MOSFET so that the control signal controlling the clock switch is fed directly to the first MOSFET and is fed to the second MOSFET via the additional transistor.

The additional transistor can be a MOSFET which is a simple inverter for actuating the MOSFET which operates inversely to the clock switch.

The first MOSFET of the above-mentioned embodiment operates as a rectifier element. Moreover, the first MOSFET and the second MOSFET which enables the establishment of a free-running circuit in a forward converter equipped with galvanic separation are actuated via a potential separating element.

In a forward converter equipped with a transformer of another embodiment according to the invention, all MOSFET's on the secondary side lie at the same source potential. This makes the actuation of these components particularly simple.

The MOSFET's of the instant invention can be used as rectifier elements and as components permitting the use of free-running circuits in forward converters having a controlled primary output and several secondary outputs wherein the control of the clock switch is influenced by a deviation from the set reference voltage of the voltage at one of the outputs.

A reduction of forward converter losses and thus an increase in efficiency by a measure known per se in connection with MOSFET's can be effected by the above invention as described below.

BRIEF DESCRIPTION OF THE DRAWINGS

Embodiments of the forward converter according to the invention will now be described with reference to two drawing figures and their operation will be explained.

DETAILED DESCRIPTION OF THE PREFERRED EMBODIMENTS

Figure 1:
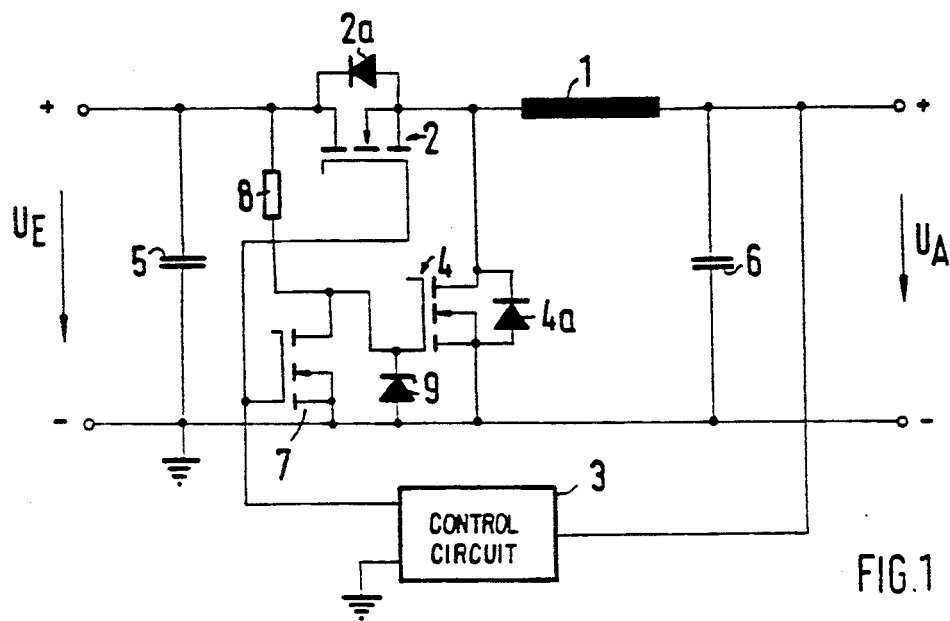
FIG. 1 is a schematic representation of the forward converter according to the present invention without transformer.

FIG. 1 shows a forward converter which converts a direct input voltage $U_E$ present at an input capacitor 5 into a lower direct output voltage $U_A$. The output terminals which are connected to a load that is to be supplied with voltage are bridged by an output capacitor 6. The forward converter further includes a storage inductance 1, a clock switch 2 and a control circuit 3 which actuates the clock switch which preferably is a power MOSFET equipped with an inverse diode 2a, by means of a pulse width modulated control signal. The width of the control pulses is here a function of the magnitude of the output voltage with respect to the set reference voltage.

In order to make possible such pulse width regulation, the output terminals of the forward converter are connected with control circuit 3.

The forward converter includes a further power MOSFET 4 equipped with an inverse diode 4a, here employed instead of the customary diode or Schottky diode, and is operated inversely relative to clock switch 2. The inverter, according to a preferred embodiment of the invention, is a further MOSFET 7 which inverts the control signal fed by control circuit 3 to clock switch 2 so that, during the ON periods of the clock switch, it short-circuits a positive voltage limited in magnitude by a Zener diode 9 and fed to the gate terminal of power MOSFET 4 by way of a resistor 8 and thus blocks power MOSFET 4. Instead of MOSFET 7, a bipolar transistor or another component able to serve as inverter can also be employed.

Figure 2:
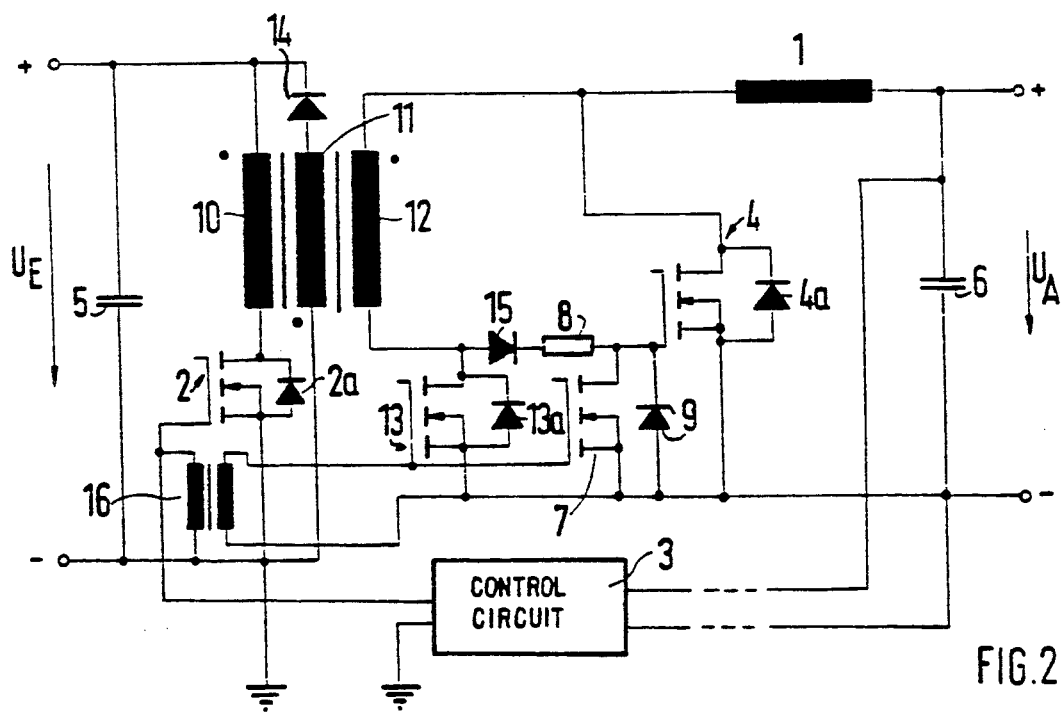
FIG. 2 shows a forward converter according to the invention equipped with an isolating transformer.

FIG. 2 shows a forward converter equipped with galvanic separation between the positive terminals of the input and output. Here again, a direct input voltage $U_E$ present at input capacitor 5 is converted into a direct output voltage $U_A$ present at output capacitor 6.

In contrast to the circuit shown in FIG. 1, the circuit according to FIG. 2 includes a transformer whose primary winding 10 is connected in series with clock switch 2. The current flowing into the storage inductance 1 so as to magnetically excite it is obtained from a secondary winding 12. It this case, the current flows through a power MOSFET 13 including an inverse diode 13a which is actuated in synchronism with clock switch 2 so as to perform a rectifier function, that is, prevent return current flow through the secondary winding of the transformer. For the sake of simplifying the actuation, MOSFET 13 is disposed on the side of the transformer secondary winding facing away from storage inductance 1.

Finally, the transformer is also provided with a demagnetization winding 11 for feeding energy stored in the transformer core via a diode 14 back into input capacitor 5.

The forward converter shown in FIG. 2 includes, as does the forward converter described in connection with FIG. 1, a power MOSFET 4 actuated by way of a MOSFET 7 inversely to clock switch 2 so as to form a free-running circuit. In the ON state, this power MOSFET 4 exhibits a very low voltage drop across its drain-source path. The gate-source voltage required for the ON state is obtained at the terminal of secondary transformer winding 12 facing away from the storage inductance. This voltage travels via a diode 15 and a resistor 8 to the gate terminal of power MOSFET 4 and the drain terminal of MOSFET 7 which is connected with it. Here again, in order to protect against excess voltages at the gate of the power MOSFET, the drain-source path of MOSFET 7 is connected in parallel with a Zener diode 9.

The positive voltage at the gate of power MOSFET 4 may also be furnished by any desired other positive voltage source. The case described here takes advantage of the fact that, after interruption of the primary current flowing through clock switch 2, a positive potential is present on the side of secondary winding 12 facing away from the storage inductor. This potential remains positive for some time and is sufficient to positively charge the gate of power MOSFET 4.

Since, in the forward converter shown in FIG. 2, a potential separation is intended to exist, such a separation must also exist in the connecting line between the positive output terminal and control circuit 3 and in the control line to the MOSFET's on the secondary side.

Today, an optocoupler (not shown) is generally employed for potential separation in the connecting line between the output and the control circuit. The potential separation between the control input line to the clock switch and the control input line to the MOSFET's on the secondary side may either also be effected by means of an optocoupler or, as shown in FIG. 2, a driver transformer 16 is employed.

Figure 3:
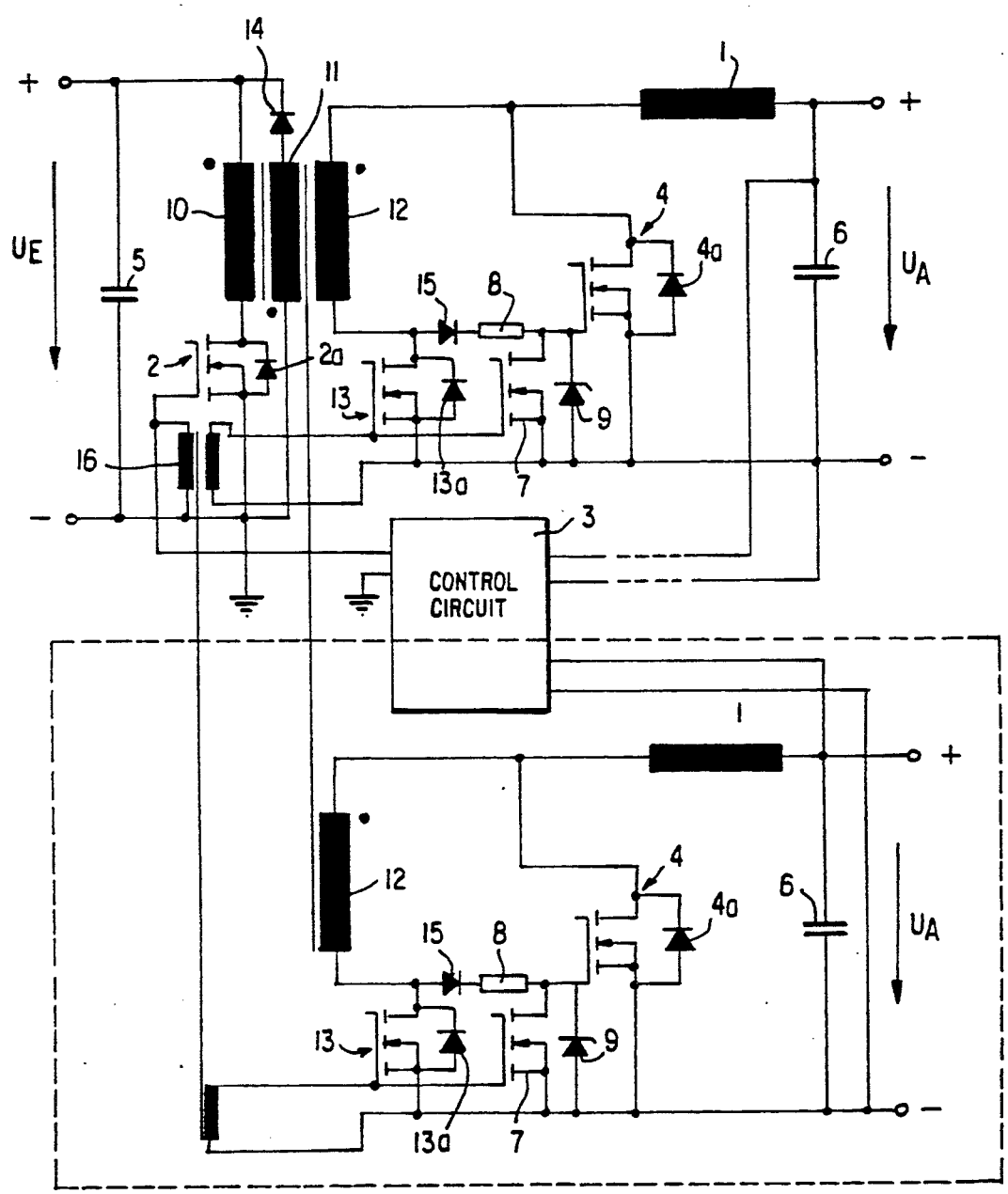
FIG. 3 shows a forward converter according to the invention providing additional secondaries and associated circuitry.

If the transformer of FIG. 2 has several secondary windings with separate converter circuits (not shown), a plurality of voltage outputs exist, each generally having a different output voltage. One output, the so-called primary output, influences the voltage follow-up control while the others, the so-called secondary outputs, generally are not individually voltage regulated. Such a configuration is shown in FIG. 3, additional secondary and associated circuitry being depicted inside the dotted lines.

In this case, the MOSFET's of the individual converter circuits must be actuated by control circuits whose potentials are separated from one another.

Any of the MOSFET's provided in the above described embodiments may, of course, be provided by two or more MOSFET's connected and actuated in parallel. As illustrated in FIGS. 4 and 5, a MOSFET having terminals A, B and C, can be replaced by two MOSFET's with terminals A', B' and C', or by a plurality of MOSFET's with terminals A'', B'' and C''.

It will be understood that the above description of the present invention is susceptible to various modifications, changes and adaptations, and the same are intended to be comprehended within the meaning and range of equivalents of the appended claims.

What is claimed is:

1. In a transformerless forward converter having at least one storage inductance, a clock switch connected in series with a winding of the at least one storage inductance, a control circuit means for outputting a control signal as a function of the magnitude of an output voltage relative to a set reference voltage, and at least one MOS field effect transistor, which is operated inversely to the clock switch and, during ON periods of the clock switch, provides a free-running circuit via the storage inductance and a load connected at the output of the forward converter, the improvement comprising:
   a further transistor operating as an inverter, the further transistor being connected to receive the control signal from the control circuit means and being connected to the gate of the at least one MOSFET so that the at least oen MOSFET receives the control signal for switching the clock switch via the further transistor as a voltage across the further transistor.

2. A forward converter as defined in claim 1, wherein the further transistor operating as inverter is a MOSFET.

3. A forward converter as defined in claim 2, wherein at least oen further identical MOSFET is connected and actuated in parallel with at least one of the MOSFET operating as a rectifier element and the MOSFET providing the free-running circuit.

4. A forward converter as defined in claim 1, wherein at least one further identical MOSFET is connected and actuated in parallel with at least one of the MOSFET operating as a rectifier element and the MOSFET providing the free-running circuit.

5. In a forward converter including a transformer, a clock switch connected in series with the primary winding of said transformer, a control circuit means for outputting a control signal as a function of the magnitude of an output voltage relative to a set reference voltage to actuate the clock switch, at least one storage inductance connected in series with a secondary winding of the transformer and connected to a first MOSFET operating as rectifier element, and at least one second MOSFET which, during ON periods of the clock switch, provides a free-running circuit viat the storage inductance and a load connected at the output of the forward converter, with the first MOSFET being controlled to be ON during the time in which the clock switch is closed and the at least one second MOSFET being controlled to be ON during the time in which the clock switch is open, the improvement comprising:

a further transistor operating as an ivnerter, the further transistor being connected to receive the control signal from the control circuit means and connected to the gate of the at least one second MOSFET so that the control signal controlling the clock switch is fed directly to the first MOSFET and is fed to the second MOSFET via the further transistor as a voltage across the further transistor.

6. A forward converter as defined in claim 5, further cmprising a potential separating element connected to the output of the control circuit means wherein the control signal controlling the clock switch is fed to the first MOSFET, second MOSFET and the further transistor via the potential separating element.

7. A forward converter as defined in calim 6, wherein the further transistor operating as an inverter is a MOSFET; the source terminals of the first MOSFET and those of the at least one second MOSFET are connected with one another; the drain terminal of the first MOSFET is connected to a terminal of the transformer secondary winding which is not connected with the storage inductance, and the drain terminal of the at least one second MOSFET is connected with a terminal of the transformer secondary winding which is connected with the storage inductance; the drain terminal of the further transistor operating as inverter is connected with the drain terminal of the first MOSFET via a current limiting resistor and a diode whose cathode is connected to operate toward the drain terminal of the fursther transistor operating a inverter; and the gate-source path of the second MOSFET is protected against excess voltages by a Zener diode connected in parallel with the second MOSFET.

8. A forward converter as defined in claim 7, wherein a plurality of secondary transformer windings are provided which are each equipped with storage inductances, first MOSFET's operating as rectifier elements and inversely operated second MOSFET's which provide free-running circuits, and each of the plurality of secondary transformer windings with associated inductances and MOSFET's furnish voltages to respective outputs, with a deviation of the voltage at at least one of the outputs from a set reference voltage influencing the control of the clock switch.

9. A forward converter as defined in claim 8, wherein at least one further identical MOSFET is connected and actuated in parallel with at least one of the MOSFET operating as a rectifier element and the MOSFET providing the free-running circuit.

10. A forward converter as defined in claim 7, wherein at least one further identical MOSFET is connected and actuated in parallel with at least one of the MOSFET operating as a rectifier element and the MOSFET providing the free-running circuit.

11. A forward converter as defined in claim 6, wherein at least one further identical MOSFET is connected and actuated in parallel with at least one of the MOSFET operating as a rectifier element and the MOSFET providing the free-running circuit.

12. A forward converter as defined in claim 6, wherein a plurality of secondary transformer windings are provided which are each equipped with storage inductances, first MOSFET's operating as recitifer elements and inversely operated second MOSFET's which provide free-running circuits, and each of the plurality of secondary transformer windings with associated inductances and MOSFET's furnish voltages to respective outputs, with a deviation of the voltage at at least one of the outputs from a set reference voltage influencing the control of the clock switch.

13. A forward converter as defined in claim 12, wherein at least one further identical MOSFET is connected and actuated in parallel with at least one of the MOSFET operating as a rectifier element and the MOSFET providing the free-running circuit.

14. A forward converter as defined in claim 5, wherein at least one further identical MOSFET is connected and actuated in parallel with at least one of the MOSFET operating as a rectifier element and the MOSFET providing the free-running circuit.

* * * * *